United States Patent
Kaneko (10) Patent No.: US 7,263,985 B2
(45) Date of Patent: Sep. 4, 2007

(54) EXHAUST EMISSION CONTROL DEVICE IN INTERNAL COMBUSTION ENGINE AND HEAT ENGINE

(75) Inventor: Takashi Kaneko, Sagamihara (JP)

(73) Assignee: Mtsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/002,061

(22) Filed: Dec. 3, 2004

(65) Prior Publication Data

US 2005/0133001 A1 Jun. 23, 2005

(30) Foreign Application Priority Data

Dec. 18, 2003 (JP) .............................. 2003-420612

(51) Int. Cl.
*F02B 51/02* (2006.01)
*F02B 3/00* (2006.01)

(52) U.S. Cl. ...................................... 123/670; 123/299
(58) Field of Classification Search ................ 123/299, 123/300, 90.11, 90.15, 270–272, 568.14
See application file for complete search history.

(56) References Cited

U.S. PATENT DOCUMENTS

| | | | | | |
|---|---|---|---|---|---|
| 3,459,167 | A | * | 8/1969 | Briggs et al. | 123/669 |
| 4,577,611 | A | * | 3/1986 | Hagino | 123/669 |
| 4,819,595 | A | * | 4/1989 | Pfefferle | 123/272 |
| 5,054,443 | A | * | 10/1991 | Kawamura | 123/254 |
| 5,070,833 | A | * | 12/1991 | Matsuoka | 123/270 |
| 6,240,912 | B1 | * | 6/2001 | Stanglmaier et al. | 123/670 |
| 6,311,653 | B1 | * | 11/2001 | Hamamoto | 123/90.11 |
| 6,422,008 | B2 | * | 7/2002 | Voss et al. | 60/299 |
| 6,431,129 | B1 | * | 8/2002 | Hammoud et al. | 123/90.15 |
| 6,491,016 | B1 | * | 12/2002 | Buratti | 123/299 |
| 6,609,490 | B2 | * | 8/2003 | Flinchbaugh et al. | 123/193.6 |
| 6,698,412 | B2 | * | 3/2004 | Dalla Betta | 123/670 |
| 6,708,680 | B2 | * | 3/2004 | Lavy et al. | 123/586 |
| 6,739,295 | B1 | * | 5/2004 | Yamaoka et al. | 123/90.15 |
| 6,807,937 | B2 | * | 10/2004 | Gianolio et al. | 123/308 |
| 6,807,956 | B2 | * | 10/2004 | Gaessler et al. | 123/568.14 |
| 6,843,053 | B2 | * | 1/2005 | Draper et al. | 60/274 |
| 6,863,058 | B2 | * | 3/2005 | Kurtz et al. | 123/672 |
| 6,895,912 | B2 | * | 5/2005 | Saruwatari et al. | 123/90.15 |
| 6,901,747 | B2 | * | 6/2005 | Tashiro et al. | 60/286 |

(Continued)

FOREIGN PATENT DOCUMENTS

JP 5-86863 4/1993

*Primary Examiner*—Hai Huynh
(74) *Attorney, Agent, or Firm*—Wenderoth, Lind & Ponack, L.L.P.

(57) ABSTRACT

Catalyst is supported at least on a part of the combustion chamber wall of an internal combustion engine. A control is provided for controlling the fuel injection equipment of the engine so that pilot fuel injection is performed prior to main fuel injection under prescribed operating conditions of the engine. A control is provided for controlling so that the exhaust valve is reopened for a prescribed period at prescribed timing, or the inlet valve is reopened for a prescribed period at prescribed timing, under prescribed operating conditions of the engine. By the combination of providing catalyst on the combustion wall and controlling fuel injection and valve overlapping, the exhaust emission of internal combustion engine can be drastically improved. The catalyst supporting structure to carry catalyst on the heat insulating material coated on a wall to which combustion gas contacts can be effectively applied to every type of heat engine.

7 Claims, 5 Drawing Sheets

U.S. PATENT DOCUMENTS

| | | |
|---|---|---|
| 6,901,906 B2 * | 6/2005 | Goto et al. .................. 123/299 |
| 7,021,276 B2 * | 4/2006 | Liu et al. ..................... 123/299 |
| 7,055,493 B2 * | 6/2006 | Bertilsson ................... 123/299 |
| 7,096,853 B2 * | 8/2006 | Tomita .................. 123/406.47 |
| 2002/0035984 A1 * | 3/2002 | Brardinelli et al. ......... 123/272 |
| 2004/0154582 A1 * | 8/2004 | Shimazaki .................. 123/299 |
| 2006/0180121 A1 * | 8/2006 | Wickman et al. ........... 123/299 |

* cited by examiner

EXHAUST EMISSION CONTROL DEVICE IN INTERNAL COMBUSTION ENGINE AND HEAT ENGINE

BACKGROUND OF THE INVENTION

1. Field of the Invention

The present invention is related to an exhaust emission control device in an internal combustion engine and a heat engine for automobile, marine or stationary use.

2. Description of the Related Art

In recent years, there is a trend that regulation of exhaust gas of internal combustion engines for automobiles, etc. (hereafter referred to as engines) is intensified. Particularly, the regulation of NOx(nitrogen oxides) and PM(particulate matter) in exhaust gas of diesel engines and regulation of NOx(nitrogen oxides) and HC(unburned gas) in exhaust gas of gasoline engines has been intensified.

In the prior art, generally exhaust emission control for reducing emissions such as HC, NOx, and PM has been performed by allowing the exhaust gas to pass through an after-treatment device, which is provided with catalyst and installed in the exhaust system, after the exhaust gas is discharged from the engine cylinder. Further, there is proposed a device in which catalyst is coated at least on a part of the wall of the combustion chamber formed by the inside surface of cylinder, inside surface of cylinder head, and top face of piston as shown in FIG. 1 of JP 5-86863, not that an after-treatment device is installed in the exhaust system.

However, there has not been disclosed an art which makes the most use of the technique supporting catalyst on the surface of combustion chamber wall by combining the technique of supporting catalyst on the surface of combustion chamber wall as shown in FIG. 1 of JP 5-86863 and the technique of controlling fuel injection through the fuel injection equipment or controlling inlet and exhaust valve timing through the valve driving gear of the engine.

SUMMARY OF THE INVENTION

The object of the present invention is to provide an exhaust emission control device in an internal combustion engine capable of improving exhaust emission control by combining effectively the technique of supporting catalyst on the surface of a combustion chamber wall and the technique of controlling fuel injection through the fuel injection equipment or controlling inlet and exhaust valve timing through the valve driving gear of the engine, and to provide an exhaust emission control device for a heat engine which makes it possible to improve exhaust emission control by allowing the catalyst to be supported effectively on the combustion chamber wall exposed to combustion gas.

To attain the aforementioned object, the present invention proposes an exhaust emission control device in an internal combustion engine equipped with electronic controlled fuel injection equipment to inject fuel directly into a combustion chamber. Catalyst is supported at least on a part of the combustion chamber wall comprising the inside surface of a cylinder, inside surface of a cylinder head, and top face of a piston. A control means is provided for controlling the fuel injection equipment so that pilot injection of a small amount of fuel is done prior to main injection of fuel under prescribed operating conditions of the engine.

It is preferable that the catalyst is supported on the top face of piston after heat insulating material is coated at least on the top face of the piston. It is also preferable in this case to adopt a catalyst supporting structure in which the catalyst is supported as ions in the crystals of a ceramic material.

Further, to attain the aforementioned object, the present invention proposes an exhaust emission control device in an internal combustion engine equipped with electronic controlled fuel injection equipment to inject fuel directly into a combustion chamber. Catalyst is supported at least on a part of the combustion chamber wall comprising the inside surface of a cylinder, inside surface of a cylinder head, and top face of a piston. An electronic controlled valve drive gear controls opening and closing of inlet and exhaust valves of the combustion chamber, and a control means controls the valve drive gear so that the exhaust valve is reopened for a prescribed period at a prescribed timing in the first half of the admission stroke during which the inlet valve is opened.

Further, to attain the aforementioned object, the present invention proposes an exhaust emission control device in an internal combustion engine equipped with electronic controlled fuel injection equipment to inject fuel directly into a combustion chamber. Catalyst is supported at least on a part of the combustion chamber wall comprising the inside surface of a cylinder, inside surface of a cylinder head, and top face of a piston. An electronic controlled valve drive gear controls opening and closing of inlet and exhaust valves of the combustion chamber, and a control means controls the valve drive gear so that the inlet valve is reopened for a prescribed period at prescribed timing in the exhaust stroke, during which the exhaust valve is opened.

The exhaust emission control device in the internal combustion engine according to the present invention to attain the aforementioned object is characterized in that catalyst is supported at least on a part of the combustion chamber wall comprising the inside surface of a cylinder, inside surface of a cylinder head, and top face of a piston after heat insulating material is coated thereon.

Further, to attain the aforementioned object, the present invention proposes an exhaust emission control device in an internal combustion engine equipped with an electronic controlled valve drive gear for controlling opening and closing of inlet and exhaust valves of the combustion chamber. Catalyst is supported at least on a part of the combustion chamber wall formed by the inside surface of a cylinder, inside surface of a cylinder head, and top face of a piston. A control means is provided to control the valve drive gear under prescribed operating conditions of the engine so that the exhaust valve is reopened for a prescribed period at prescribed timing in the first half of the admission stroke, during which the inlet valve is opened.

The present invention proposes, to attain the aforementioned object, an exhaust emission control device in the internal combustion engine equipped with an electronic controlled valve drive gear for controlling opening and closing of inlet and exhaust valves of the combustion chamber. Catalyst is supported at least on a part of the combustion chamber wall formed by the inside surface of a cylinder, inside surface of a cylinder head, and top face of a piston. A control means is provided to control the valve drive gear under prescribed operating conditions of the engine so that the inlet valve is reopened for a prescribed period at prescribe timing in the exhaust stroke during which the exhaust valve is opened.

The present invention proposes to attain the aforementioned object, an exhaust emission control device in the internal combustion engine equipped with an electronic controlled valve drive gear for controlling opening and closing of inlet and exhaust valves of the combustion chamber. Catalyst is supported at least on a part of the combustion chamber wall formed by the inside surface of a cylinder, inside surface of a cylinder head, and top face of a piston. A control means is provided to control the valve drive gear when the exhaust gas temperature is detected as higher than a proper temperature so that both the exhaust and inlet valves are being opened near the end of the exhaust stroke over to the start of the inlet stroke.

The present invention proposes to attain the aforementioned object, an exhaust emission control device in a heat engine composed such that catalyst is supported on the wall exposed to combustion gas by means of a heat insulating material layer coated on the wall.

DETAILED DESCRIPTION OF THE PREFERRED EMBODIMENTS

Preferred embodiments of the exhaust emission control device according to the present invention will now be detailed with reference to the accompanying drawings.

First Embodiment

Figure 1:
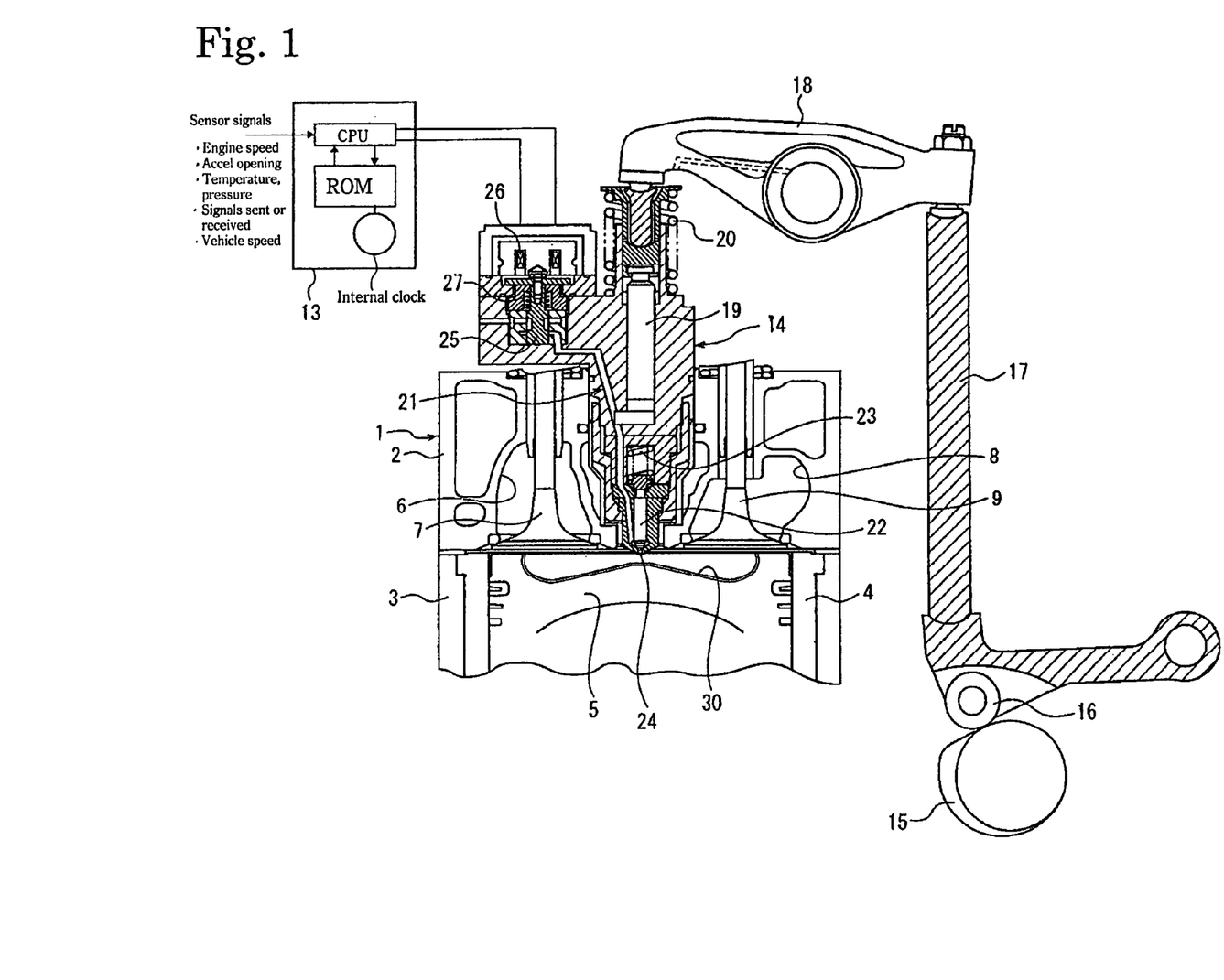
FIG. 1 is a drawing for explaining the structure of an automobile internal combustion engine of a first embodiment according to the present invention.
Figure 2:
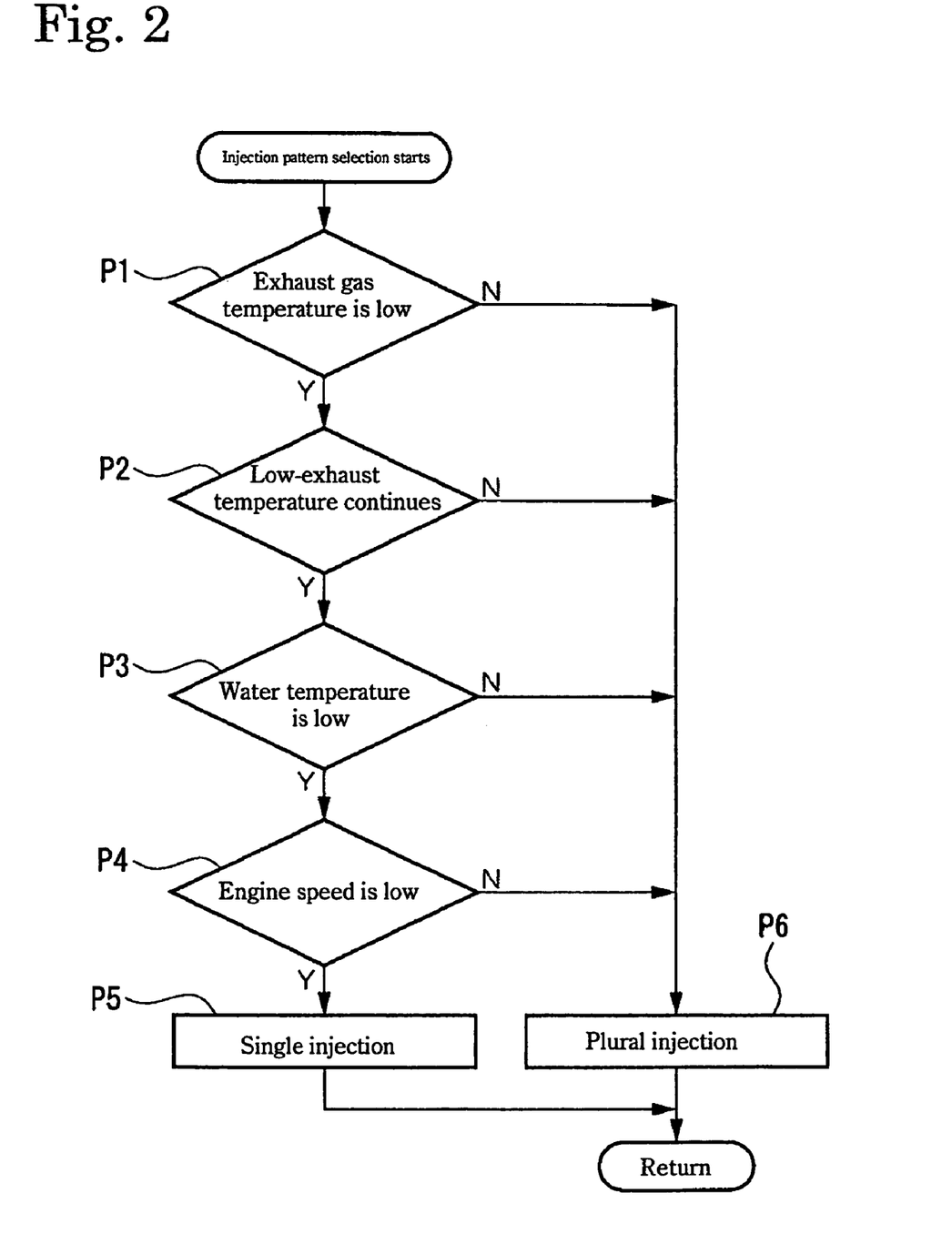
FIG. 2 is a flow chart for selecting an injection pattern.
Figure 3:
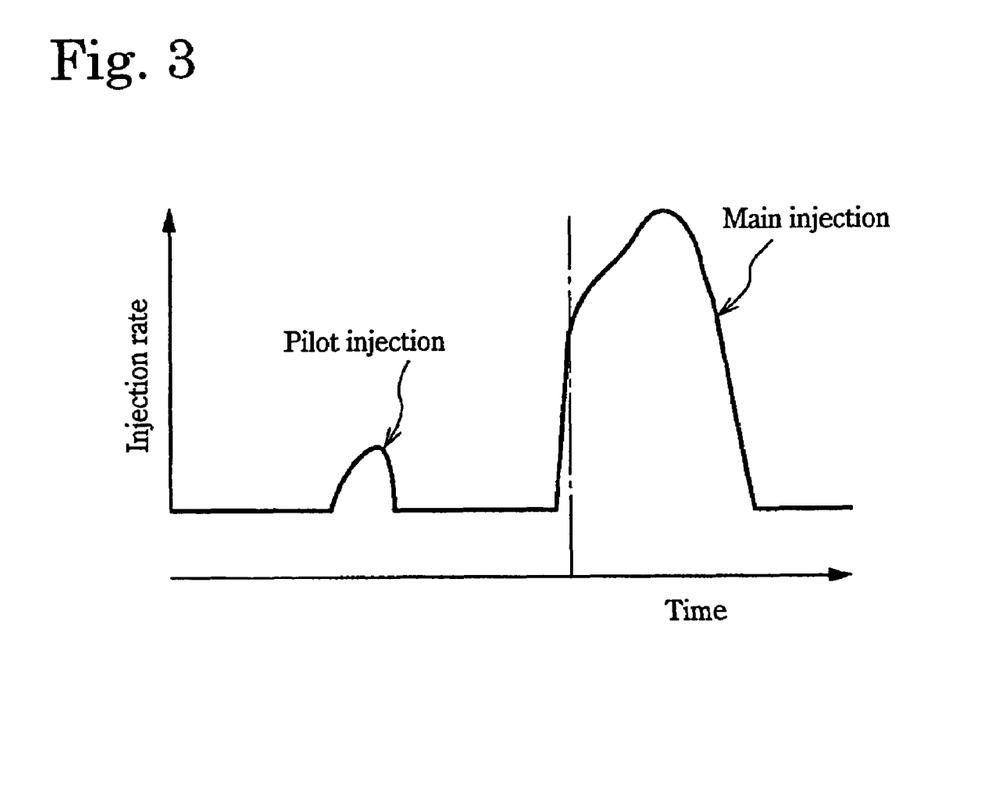
FIG. 3 is a graph for explaining an injection pattern.

FIG. 1 is a drawing for explaining the structure of an automobile internal combustion engine of a first embodiment according to the present invention, FIG. 2 is a flow chart for selecting an injection pattern, and FIG. 3 is a graph for explaining an injection pattern.

Referring to FIG. 1, a multi-cylinder internal combustion engine (hereafter referred to simply as an engine) 1 comprises a cylinder head 2 and a cylinder block 3. A piston 5 is fitted into each of cylinder liners 4 of the cylinder block 3 for sliding. A catalyst such as platinum(Pt), palladium(Pd), rhodium(Rh), etc. is coated(supported) (see catalyst coating layer 30 in FIG. 1).

An inlet valve 7 and exhaust valve 9 are provided for each of the cylinders in the cylinder head 2 for opening and closing the inlet port 6 and exhaust port 8, respectively. These inlet and exhaust valves are driven by means of valve driving gears.

A unit injector 14, which is composed to be electronic controlled fuel injection equipment, is mounted to the cylinder head 2 for each of the cylinders. The rotation of a crankshaft (not shown in the drawing) is transferred to a cam shaft 15 and the rotation of the camshaft 15 is converted by way of a cam follower 16 and a push rod 17 to rocking motion of a rocker arm 18. When the plunger 19 of the unit injector 14 is pushed down by the rocking motion of the rocker arm 18 against the spring force of a return spring 20 by a rocker arm 18, fuel is injected into the combustion chamber by the downward movement of the plunger 19. When the plunger 19 moves down, the fuel between the bottom end of the plunger 19 and a poppet valve 25 is compressed, a needle valve 22 is lifted up by the pressure against the spring force of a needle valve spring 23, by which injection holes 24 are opened, and fuel is injected through the injection holes 24 into the combustion chamber.

Injection timing and the amount of fuel injected are controlled through controlling the opening and closing of fuel passage 21 by the poppet valve 25 by means of a solenoid 26. When the poppet valve 25 is attracted against the spring force of the poppet valve spring 27 toward the solenoid 26 through magnetization the solenoid upon receiving a control signal from electronic control unit(ECU) 13 and the valve 25 is closed(a fuel passage 21 is shutoff), the fuel between the bottom end of the plunger 19 and poppet valve 25 is compressed by the downward moving of the plunger 19. When the excitation of the solenoid 26 is relieved and the poppet valve 25 is pushed down by the spring force of the poppet valve spring 27 to be opened(the fuel passage 21 is communicated through to a fuel tank not shown in the drawing), the fuel between the bottom end of the plunger 19 and poppet valve 25 can not be compressed by the downward moving of the plunger 19. Therefore, the beginning and end of fuel injection can be controlled by the closing and opening of the poppet valve 25 and the amount of fuel injection can be controlled by the period between the closing and opening of the poppet valve 25.

The ECU 13 comprises a central processing unit(CPU), a read only memory (ROM), an integrated clock and an interface as an input/output processing circuit. The ECU receives signals of engine speed, the opening of the accelerator, temperatures of engine cooling water, exhaust gas, etc., pressures of intake air and exhaust gas, etc., a signal sent from and received by an in-vehicle unit of ETC(non-stop automatic fare collecting system), and signals from sensors such as a vehicle speed sensor, etc. and controls the injection timing and the amount of fuel injection of the unit injector 14 to an optimum in accordance with the operating condition of the engine.

As shown in FIG. 2 and FIG. 3, the ECU 13 performs control so that single injection in which only main injection of fuel with ordinary injection timing is done when the engine 1 is running under prescribed operating conditions, that is, when the exhaust gas temperature is low, this condition continues for a long period, engine cooling water temperature is low, and engine speed is low (see steps 1~5 in FIG. 2). When the engine 1 is running under other conditions, the ECU 13 performs control so that multi-injection is done in which pilot injection of a small amount of fuel is done for exhaust emission control in the admission stroke or compression stroke prior to main injection and then main injection is done with ordinary injection timing(see step 6 in FIG. 2).

As the engine 1 is composed so that fuel injection is controlled in this way, when the engine is running at a low speed, a low load range, for example, in which single injection is performed, fuel is injected with ordinary injection timing by the unit injector and steady combustion is maintained.

On the other hand, when the engine is running in a middle or high speed, a middle or high load range, for example, in which multi-injection is performed, HC, CO(carbon monoxide) are produced by the pilot injection in the admission stroke or compression stroke, and NOx produced by the main injection in the combustion stroke(expansion stroke) is effectively reduced(deoxidized) by the HC by the presence of catalyst layer 30 coated on the top face of the piston 5, resulting in an improved exhaust emission.

As the production of NOx is reduced inside the engine 1, an after-treatment device such as a NOx occlusion catalyst is not necessary to be provided in the exhaust system(of course, it may be provided). Incidentally, if the distance from the cylinder to the after-treatment device is long, the exhaust gas temperature lowers due to heat loss in the exhaust system and the activity of the catalyst reduces. According to the present invention, as the decrease in temperature of exhaust gas like this does not occur, NOx is effectively reduced by the action of the catalyst of good activity.

As heat capacity is small in the device according to the present invention, compared to the case in which the after-treatment device is used in which heat capacity becomes large through the exhaust system, the coated catalyst layer 30 is rapidly heated together with the warming of the engine 1 when the engine is started.

Further, as delay in response is short in transient conditions of the engine 1 compared to the case of the after-treatment device, it is possible to switch the fuel injection pattern immediately from single injection to multi-injection optimal for reducing NOx.

Second Embodiment

Figure 4:
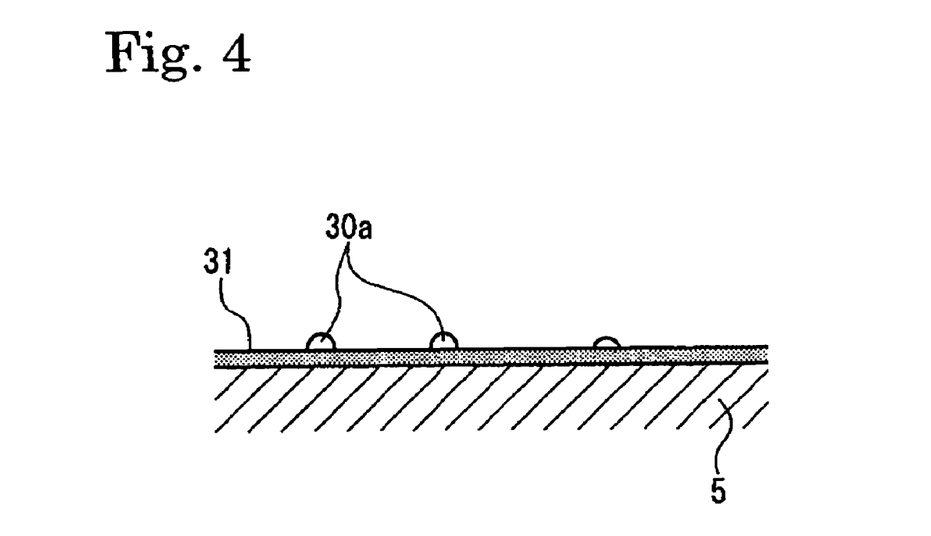
FIG. 4 is a sectional view showing a second embodiment of catalyst supporting structure of the present invention.

FIG. 4 shows a sectional view of a second embodiment of catalyst supporting structure of the present invention.

This embodiment is an example of the case in which catalysts 30*a* such as platinum(Pt), palladium(Pd), rhodium (Rh), etc. are supported in a shape of scattered spots on the combustion chamber wall formed on the top face of the piston 5 after material having high heat insulating effect such as ceramics is coated thereon by thermal spraying, for example(see thermal-sprayed ceramic layer 31).

With this catalyst supporting structure, as the temperature of the piston top face is maintained high by the presence of the thermal-sprayed ceramic layer 31, the activity of the catalysts 30*a* rises and further improvement in exhaust emission and improvement in fuel consumption are achieved by heat insulation effect.

By applying the catalyst supporting structure on the top face of the piston 5 to the surface of the wall exposed to combustion gas(or exhaust gas) of a heat engine, reduction in heat loss and improvement in activity of catalyst can be achieved in every kind of heat engine such as a gas turbine, boiler, etc.

Third Embodiment

Figure 5:
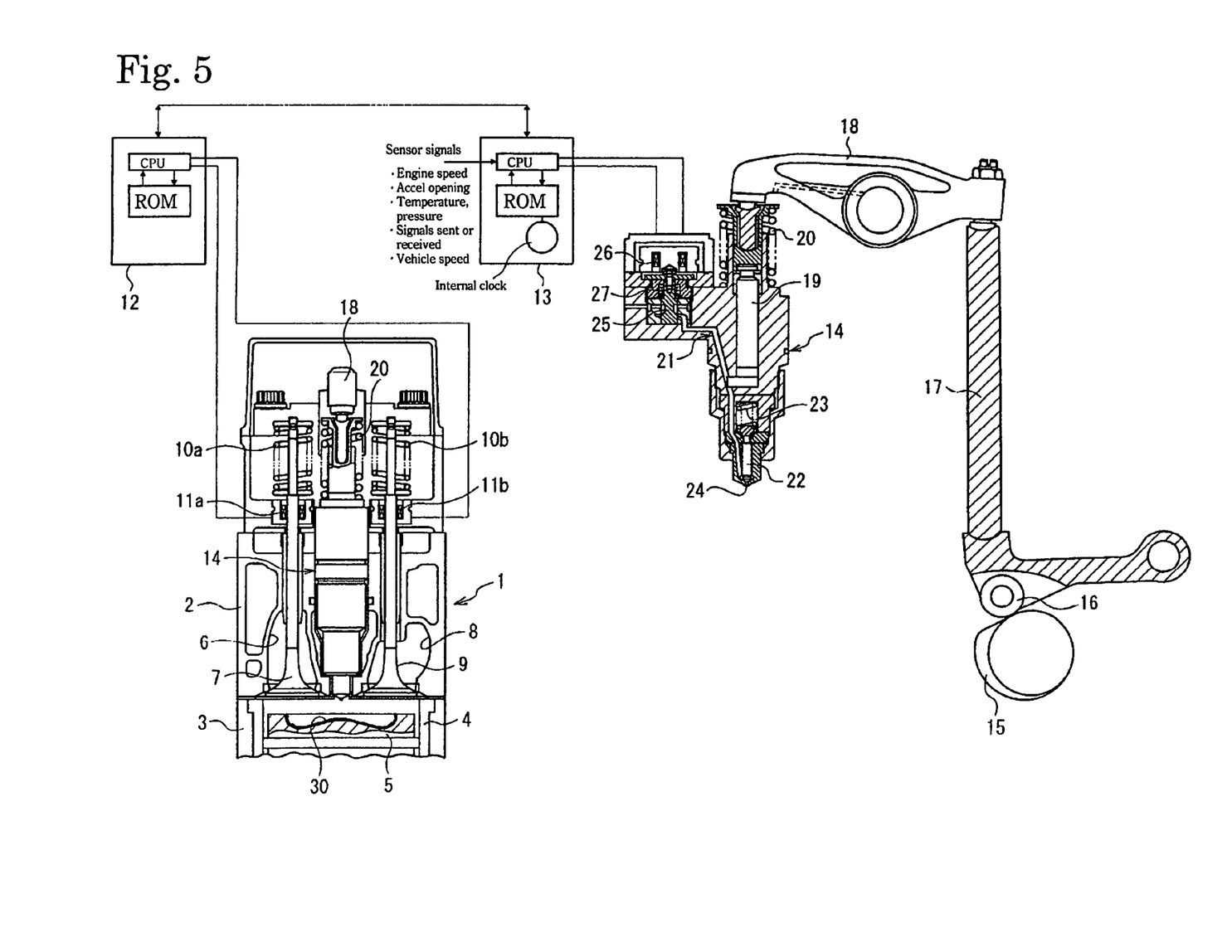
FIG. 5 is a drawing for explaining the structure of an automobile internal combustion engine of a third embodiment according to the present invention.
Figure 6A:
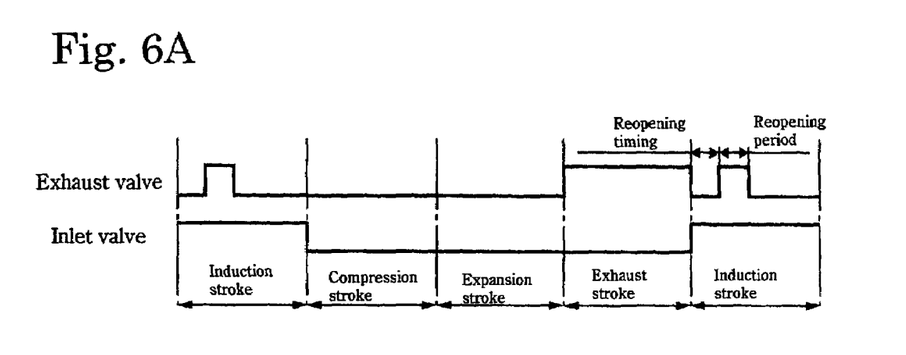
FIG. 6A is a graph for explaining the control of reopening the exhaust valve.
Figure 6B:
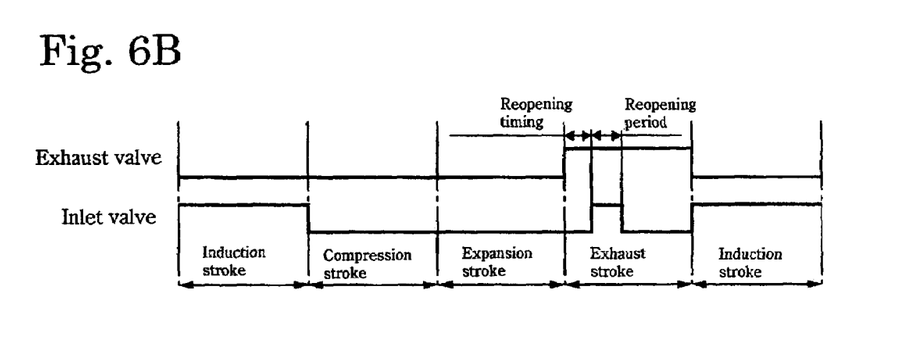
FIG. 6B is a graph for explaining the control of reopening the inlet valve.
Figure 7:
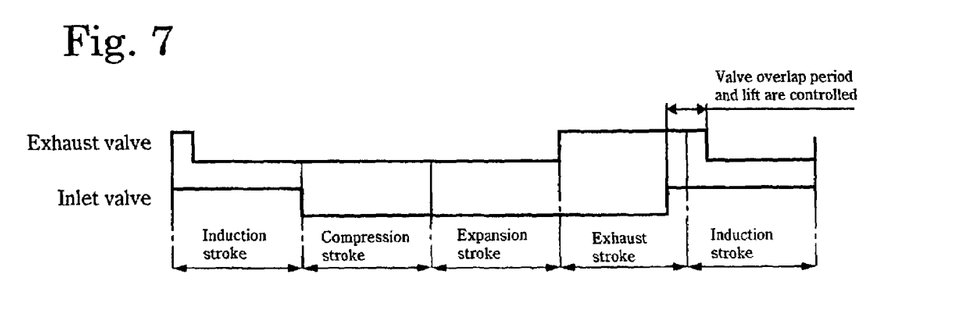
FIG. 7 is a graph for explaining the state in which both the exhaust and inlet valves are being opened (valve overlap) near the end of the exhaust stroke over to the start of the inlet stroke.

FIG. 5 is a drawing for explaining the structure of an automobile internal combustion engine of a third embodiment according to the present invention, FIG. 6A is a graph for explaining the control of reopening the exhaust valve, and FIG. 6B is a graph for explaining the control of reopening the inlet valve. FIG. 7 is a graph for explaining the state of both the exhaust and inlet valves being opened(valve overlap) near the end of the exhaust stroke over to near the start of inlet stroke.

This embodiment is an example of the case in which the opening/closing of inlet valve 7 and exhaust valve 9 are controlled by an electronic controlled valve drive gears as shown in FIG. 5. The inlet valve 7 and exhaust valve 9 are forced upward by a valve spring 10*a* and 10*b* to close an inlet port 6 and exhaust port 8, respectively. When solenoids 11*a* and 11*b* as control means are excited by control signals from an electronic control unit (ECU) 12 for controlling inlet and exhaust valves, the inlet valve 7 and exhaust valve 9 are moved down against the spring force of the valve spring 10*a* and 10*b* to open the inlet port 6 and exhaust port 8, respectively. The construction other than that is the same as that of FIG. 1.

The ECU 12 comprises a central processing unit(CPU), a read only memory(ROM), an integrated clock and an interface as input/output processing circuit. The ECU 12 controls the timing of opening and closing and opening period of the inlet valve 7 and exhaust valve 9 to be optimal in accordance with running conditions of the engine 1 based on the information from the ECU 13 of the first embodiment, the ECU 12 being connected to the ECU 13 by a communication means such as a control area network(CAN).

The ECU 12 controls so that the exhaust valve 9 is reopened in the admission stroke at an optimal timing and for an optimal period as shown in FIG. 6A when the multi-injection explained referring to FIG. 1 is performed for example when the engine is running in a middle or high speed, or middle or high load range, in order to allow the exhaust gas to flow back to the combustion chamber during the valve overlap period brought about by the reopening of the exhaust valve 9 (internal EGR), then main fuel injection is performed by the unit injector 14.

The ECU 12 controls so that the inlet valve 7 is reopened in the exhaust stroke at an optimal timing and for an optimal period as shown in FIG. 6B when the multi-injection explained referring to FIG. 1 is performed for example when the engine is running in a middle or high speed, or middle or high load range, in order to allow the exhaust gas to flow back to the inlet manifold during the valve overlap period brought about by the reopening of the inlet valve 7 (internal EGR), then main fuel injection is performed by the unit injector 14.

Further, the ECU 12 controls so that the closing of the exhaust port is retarded and the opening of the inlet port is advanced as shown in FIG. 7 to control the valve overlap period, and also controls the valve lifts of inlet and exhaust valves when it is detected that the exhaust gas temperature of the engine 1 exceeds the temperature that the catalyst can withstand in order to lower the exhaust gas temperature by allowing fresh gas to short-circuit passing through the combustion chamber.

With this embodiment, oxidization of PM in the exhaust gas and an effect of reduction in NOx by reduction reaction utilizing HC produced by the pilot injection are achieved by the catalytic reaction of the catalyst layer coated on the top face of the piston 5, and in addition to that, another effect of reduction in NOx is achieved by combustion in an atmosphere of low oxygen density due to internal EGR by which the maximum combustion temperature is lowered. Further, an increase in activity of the catalyst is expected with increased temperature of the exhaust gas by said internal EGR.

By injecting pilot fuel directly into the combustion chamber immediately after the exhaust valve 9 is reopened, time retard accompanying the back flow of exhaust gas is evaded, and the internally recirculated exhaust gas is prevented from flowing out to the exhaust system directly by the combined control of internal EGR and pilot fuel injection.

It is permissible that the multi-injection explained referring to FIG. 1 of the first embodiment is not performed in the third embodiment. It is of course suitable to adopt the catalyst supporting structure of the second embodiment in the third embodiment. Although in the embodiments explained in the foregoing the catalyst is supported on the top face of the piston 5, it is suitable that the catalyst is supported on the inside surface of the cylinder liner 4 or cylinder in the case of a linerless cylinder block, or on the inside surface of the cylinder head 2. Further, it is suitable as a modification of the third embodiment that the valve drive gears are controlled so that the inlet valve 7 is opened near the end of exhaust stroke in which the exhaust valve 9 is being opened in order to control the exhaust gas temperature in a proper temperature range when the ECU 12 detects by the signals of temperature sensors of exhaust temperature, etc. that the exhaust temperature exceeds a prescribed proper temperature.

According to the exhaust emission control device in an internal combustion engine composed as mentioned above, the NOx produced by the combustion of the main fuel injected in the combustion chamber can be effectively reduced (deoxidized) by the HC of the pilot fuel injected prior to the main injection by the catalytic reaction of the catalyst supported on the wall of the combustion chamber. By the improvement of catalyst supporting structure, exhaust emission is further improved. Exhaust emission is further improved by performing internal EGR (exhaust gas recirculation) through control so that both the inlet and exhaust valves are opened for some period (valve overlap).

By providing a control means for controlling the valve driving gears so that both the inlet and exhaust valves are opened near the end of the exhaust stroke over to the start of the inlet stroke and controlling the amount of air passing directly from the inlet port to the exhaust port passes through the combustion chamber, an excessive rise in exhaust temperature is suppressed. As a result, heat deterioration of the catalyst is prevented and reliability of the internal combustion engine is improved.

According to the exhaust emission control device in a heat engine constructed as mentioned in the foregoing, a reduction in heat loss and improvement in the activity of the catalyst can be achieved.

The exhaust emission control device according to the present invention is applicable to stationary engines, marine engines or heat engines, and not only to automobile engines.

What is claimed is:

1. An exhaust emission control device in an internal combustion engine equipped with electronic controlled fuel injection equipment for injecting fuel directly into a combustion chamber, wherein a NOx deoxidizing catalyst is supported at least on a part of a combustion chamber wall selected from at least one of the group consisting of an inside surface of a cylinder, an inside surface of a cylinder head and a top face of a piston; and comprising a control means for controlling said fuel injection equipment so that a single injection is carried out in which only main injection of fuel is carried out under a low speed or low load operating condition, and so that multiple injection is carried out in which a pilot injection of a small amount of fuel for supplying HC, used for reducing NOx by catalytic reaction, is carried out prior to main injection under a middle or high speed, or middle or high load, operating condition of the engine.

2. The exhaust emission control device in the internal combustion engine of claim 1 in which said control means is further for controlling said fuel injection equipment so that said pilot injection is not carried out prior to a main injection of fuel under a low speed or low load operating condition of the engine.

3. The exhaust emission control device in the internal combustion engine according to claim 1, wherein said catalyst is supported on said top face of said piston by way of a heat insulating material coated at least on said top face of said piston.

4. An exhaust emission control device according to claim 1, wherein said catalyst comprises scattered spots supported by way of a heat insulating material coated on said part of said combustion chamber wall selected from at least one of the group consisting of an inside surface of a cylinder, an inside surface of a cylinder head and a top face of a piston.

5. An exhaust emission control device in an internal combustion engine equipped with electronic controlled fuel injection equipment for injecting fuel into a combustion chamber and electronic controlled valve drive gear for controlling opening and closing of an inlet valve and an exhaust valve of a combustion chamber, wherein NOx deoxidizing catalyst is supported at least on a part of the combustion chamber wall selected from at least one of the group consisting of an inside surface of a cylinder, an inside surface of a cylinder head and a top face of a piston, and comprising a first control means for controlling said fuel injection equipment so that pilot injection of a small amount of fuel, for supplying HC utilized to reduce NOx by catalytic reaction, is carried out prior to a main injection of fuel under a middle or high speed, or middle or high load, operating condition of the engine, and a second control means for controlling said valve drive gear so that the exhaust valve is reopened for a prescribed period at a prescribed timing during a first half of an admission stroke during which the inlet valve is open.

6. An exhaust emission control device in an internal combustion engine equipped with electronic controlled fuel injection equipment for injecting fuel into a combustion chamber and electronic controlled valve drive gear for controlling opening and closing of an inlet valve and an exhaust valve of a combustion chamber, wherein NOx deoxidizing catalyst is supported at least on a part of a combustion chamber wall selected from at least one of the group consisting of an inside surface of a cylinder, an inside surface of a cylinder head and a top face of a piston, and comprising a first control means for controlling said fuel injection equipment so that pilot injection of a small amount of fuel, for supplying HC utilized to reduce NOx by catalytic reaction, is carried out prior to a main injection of fuel under a middle or high speed, or middle or high load, operating condition of the engine, and a second control means for controlling said valve drive gear under prescribed operating conditions of the engine so that the inlet valve is reopened for a prescribed period at a prescribed timing during an exhaust stroke during which the exhaust valve is opened.

7. An exhaust emission control device in an internal combustion engine equipped with electronic controlled fuel injection equipment for injecting fuel into a combustion chamber and electronic controlled valve drive gear for controlling opening and closing of an inlet valve and an exhaust valve of a combustion chamber, wherein catalyst is supported at least on a part of a combustion chamber wall selected from at least one of the group consisting of an inside surface of a cylinder, an inside surface of a cylinder head and a top face of a piston, and comprising a first control means for controlling said fuel injection equipment so that a pilot injection of a small amount of fuel for supplying HC utilized for reducing NOx by catalytic reaction is carried out prior to main injection under a middle or high speed, or middle or high load operation condition of the engine, and a second control means for controlling said valve drive gear when the exhaust gas temperature is detected as higher than a proper temperature so that both the exhaust valve and the inlet valve are opened from near an end of an exhaust stroke to near the start of an inlet stroke and controlling the amount of air passing directly from the inlet port to the exhaust port, passing through the combustion chamber, so that an excessive rise in exhaust temperature is suppressed.

* * * * *